(12) United States Patent
Haitao et al.

(10) Patent No.: US 8,665,544 B2
(45) Date of Patent: Mar. 4, 2014

(54) SYSTEMS AND METHODS FOR SERVO DATA DETECTION

(75) Inventors: Xia Haitao, San Jose, CA (US); Xun Zhang, Westford, MA (US); Shaohua Yang, San Jose, CA (US); Hongwei Song, Longmont, CO (US)

(73) Assignee: LSI Corporation, San Jose, CA (US)

( * ) Notice: Subject to any disclaimer, the term of this patent is extended or adjusted under 35 U.S.C. 154(b) by 365 days.

(21) Appl. No.: 13/100,021

(22) Filed: May 3, 2011

(65) Prior Publication Data

US 2012/0281305 A1 Nov. 8, 2012

(51) Int. Cl.
*G11B 5/09* (2006.01)
*G11B 5/00* (2006.01)
*G11B 5/596* (2006.01)

(52) U.S. Cl.
USPC .............................. 360/49; 360/32; 360/77.08

(58) Field of Classification Search
None
See application file for complete search history.

(56) References Cited

U.S. PATENT DOCUMENTS

| | | | |
|---|---|---|---|
| 3,973,182 A | 8/1976 | Kataoka | |
| 3,973,183 A | 8/1976 | Kataoka | |
| 4,024,571 A | 5/1977 | Dischert et al. | |
| 4,777,544 A | 10/1988 | Brown et al. | |
| 5,130,866 A | 7/1992 | Klaassen et al. | |
| 5,237,325 A | 8/1993 | Klein et al. | |
| 5,278,703 A | 1/1994 | Rub et al. | |
| 5,309,357 A | 5/1994 | Stark et al. | |
| 5,341,249 A | 8/1994 | Abbott et al. | |
| 5,377,058 A | 12/1994 | Good et al. | |
| 5,521,948 A | 5/1996 | Takeuchi | |
| 5,523,902 A | 6/1996 | Pederson | |
| 5,594,341 A | 1/1997 | Majidi-Ahy | |
| 5,668,679 A | 9/1997 | Swearingen et al. | |
| 5,696,639 A | 12/1997 | Spurbeck et al. | |
| 5,781,129 A | 7/1998 | Schwartz et al. | |
| 5,787,125 A | 7/1998 | Mittel | |
| 5,798,885 A | 8/1998 | Saiki et al. | |
| 5,835,295 A | 11/1998 | Behrens | |
| 5,844,920 A | 12/1998 | Zook et al. | |
| 5,852,524 A | 12/1998 | Glover et al. | |
| 5,892,632 A | 4/1999 | Behrens | |
| 5,955,783 A | 9/1999 | Ben-Efraim | |
| 5,970,104 A | 10/1999 | Zhong et al. | |
| 5,986,830 A | 11/1999 | Hein | |
| 5,987,562 A | 11/1999 | Glover | |
| 6,009,549 A | 12/1999 | Bliss et al. | |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 12/663,319, filed Dec. 7, 2009, Ratnakar Aravind.

(Continued)

*Primary Examiner* — Daniell L Negron
(74) *Attorney, Agent, or Firm* — Hamilton DeSanctis & Cha (57) ABSTRACT

Various embodiments of the present invention provide systems and methods for data processing. As an example, a data processing circuit is disclosed that includes a codeword detector circuit operable to apply a codeword based data detection algorithm to a data input corresponding to an encoded servo data region to yield a detected output, and a servo address mark processing circuit operable to identify a pre-defined pattern in the detected output.

25 Claims, 5 Drawing Sheets

(56) References Cited

U.S. PATENT DOCUMENTS

| | | | |
|---|---|---|---|
| 6,023,383 A | 2/2000 | Glover et al. |
| 6,069,583 A | 5/2000 | Silvestrin et al. |
| 6,081,397 A | 6/2000 | Belser |
| 6,111,712 A | 8/2000 | Vishakhadatta et al. |
| 6,208,478 B1 | 3/2001 | Chiu et al. |
| 6,269,058 B1 | 7/2001 | Yamanoi et al. |
| 6,278,591 B1 | 8/2001 | Chang |
| 6,345,074 B1 * | 2/2002 | Turk et al. ............... 375/341 |
| 6,400,518 B1 | 6/2002 | Bhaumik et al. |
| 6,404,829 B1 | 6/2002 | Sonu |
| 6,411,452 B1 | 6/2002 | Cloke |
| 6,441,661 B1 | 8/2002 | Aoki et al. |
| 6,490,110 B2 | 12/2002 | Reed et al. |
| 6,493,162 B1 | 12/2002 | Fredrickson |
| 6,519,102 B1 | 2/2003 | Smith |
| 6,530,060 B1 | 3/2003 | Vis et al. |
| 6,603,622 B1 | 8/2003 | Christiansen et al. |
| 6,606,048 B1 | 8/2003 | Sutardja |
| 6,633,447 B2 | 10/2003 | Franck et al. |
| 6,646,822 B1 | 11/2003 | Tuttle et al. |
| 6,657,802 B1 | 12/2003 | Ashley et al. |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,839,014 B2 | 1/2005 | Uda |
| 6,856,183 B2 | 2/2005 | Annampedu |
| 6,876,511 B2 | 4/2005 | Koyanagi |
| 6,912,099 B2 | 6/2005 | Annampedu et al. |
| 6,963,521 B2 | 11/2005 | Hayashi |
| 6,999,257 B2 | 2/2006 | Takeo |
| 6,999,264 B2 | 2/2006 | Ehrlich |
| 7,002,761 B1 | 2/2006 | Sutardja et al. |
| 7,002,767 B2 | 2/2006 | Annampedu et al. |
| 7,038,875 B2 | 5/2006 | Lou et al. |
| 7,054,088 B2 | 5/2006 | Yamazaki et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,136,250 B1 | 11/2006 | Wu et al. |
| 7,154,689 B1 | 12/2006 | Shepherd et al. |
| 7,167,328 B2 | 1/2007 | Annampedu et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,206,146 B2 | 4/2007 | Flynn et al. |
| 7,230,789 B1 | 6/2007 | Brunnett et al. |
| 7,248,425 B2 | 7/2007 | Byun et al. |
| 7,253,984 B1 | 8/2007 | Patapoutian et al. |
| 7,265,937 B1 | 9/2007 | Erden et al. |
| 7,286,313 B2 | 10/2007 | Erden et al. |
| 7,301,717 B1 | 11/2007 | Lee et al. |
| 7,308,057 B1 | 12/2007 | Patapoutian |
| 7,323,916 B1 | 1/2008 | Sidiropoulos et al. |
| 7,362,536 B1 | 4/2008 | Liu et al. |
| 7,375,918 B1 | 5/2008 | Shepherd et al. |
| 7,411,531 B2 | 8/2008 | Aziz et al. |
| 7,420,498 B2 | 9/2008 | Barrenscheen |
| 7,423,827 B2 | 9/2008 | Neville et al. |
| 7,446,690 B2 | 11/2008 | Kao |
| 7,499,233 B1 * | 3/2009 | Han et al. ............... 360/65 |
| 7,499,238 B2 | 3/2009 | Annampedu |
| 7,525,460 B1 | 4/2009 | Liu et al. |
| 7,529,320 B2 | 5/2009 | Byrne et al. |
| 7,558,177 B2 | 7/2009 | Ogura et al. |
| 7,602,568 B1 | 10/2009 | Katchmart |
| 7,616,395 B2 | 11/2009 | Yamamoto |
| 7,620,101 B1 | 11/2009 | Jenkins |
| 7,630,155 B2 | 12/2009 | Maruyama et al. |
| 2002/0001151 A1 | 1/2002 | Lake |
| 2002/0150179 A1 | 10/2002 | Leis et al. |
| 2002/0176185 A1 | 11/2002 | Fayeulle et al. |
| 2002/0181377 A1 | 12/2002 | Nagata et al. |
| 2003/0090971 A1 | 5/2003 | Gushima et al. |
| 2003/0095350 A1 | 5/2003 | Annampedu et al. |
| 2004/0179460 A1 | 9/2004 | Furumiya et al. |
| 2005/0046982 A1 | 3/2005 | Liu et al. |
| 2005/0157415 A1 | 7/2005 | Chiang |
| 2005/0243455 A1 | 11/2005 | Annampedu |
| 2007/0064847 A1 | 3/2007 | Gaedke |
| 2007/0071152 A1 | 3/2007 | Chen et al. |
| 2007/0103805 A1 | 5/2007 | Hayashi |
| 2007/0104300 A1 | 5/2007 | Esumi et al. |
| 2007/0183073 A1 | 8/2007 | Sutardja et al. |
| 2007/0230015 A1 | 10/2007 | Yamashita |
| 2007/0263311 A1 | 11/2007 | Smith |
| 2007/0280059 A1 | 12/2007 | Cheng et al. |
| 2008/0056403 A1 | 3/2008 | Wilson |
| 2008/0080082 A1 | 4/2008 | Erden et al. |
| 2008/0212715 A1 | 9/2008 | Chang |
| 2008/0266693 A1 | 10/2008 | Bliss et al. |
| 2009/0002862 A1 | 1/2009 | Park |
| 2009/0142620 A1 | 6/2009 | Yamamoto et al. |
| 2009/0245448 A1 | 10/2009 | Ran et al. |
| 2009/0274247 A1 | 11/2009 | Galbraith et al. |

OTHER PUBLICATIONS

U.S. Appl. No. 12/838,601, filed Aug. 19, 2010, Wilson, Ross.
U.S. Appl. No. 12/851,475, filed Aug. 5, 2010, Annampedu, Viswanath.
U.S. Appl. No. 12/887,327, filed Sep. 21, 2010, Llu et al.
U.S. Appl. No. 12/894,221, filed Sep. 30, 2010, Yang et al.
U.S. Appl. No. 12/946,048, filed Nov. 15, 2010, Yang et al.
U.S. Appl. No. 12/947,962, filed Nov. 17, 2010, Liu et al.
U.S. Appl. No. 12/946,033, filed Nov. 15, 2010, Yang et al.
U.S. Appl. No. 12/955,789, filed Nov. 29, 2010, Annampedu et al.
U.S. Appl. No. 12/955,821, filed Nov. 29, 2010, Annampedu et al.
U.S. Appl. No. 12/972,904, filed Dec. 20, 2010, Viswanath Annampedu.
U.S. Appl. No. 13/100,021, filed May 3, 2011, Xia, Haitao et al.
U.S. Appl. No. 13/113,210, filed May 23, 2011, Zhang, Xun et al.
U.S. Appl. No. 13/014,754, filed Jan. 27, 2011, Viswanath Annampedu.
U.S. Appl. No. 13/009,067, filed Jan. 19, 2011, Zhang, Xun et.al.
U.S. Appl. No. 13/050,048, filed Mar. 17, 2011, Xia, Haitao et.al.
U.S. Appl. No. 13/096,873, filed Apr. 28, 2011, Wilson, Ross S.
U.S. Appl. No. 13/173,088, filed Jun. 30, 2011, Grundvig, et al.
U.S. Appl. No. 13/186,267, filed Jul. 19, 2011, Xia, Haitao et al.
U.S. Appl. No. 13/242,983, Sep. 23, 2011, Grundvig, Jeffery P.
Annampedu, V. et al, "Adaptive Algorithms for Asynchronous Detection of Coded Servo Signals Based on Interpolation", IEEE Transactions on Magnetics, vol. 41, No. 10, Oct. 2005.
Aziz and Annampedu, "Asynchronous Maximum Likelihood (ML) Detection of Servo repeatable Run Out (RRO) Data" Magnetics Conf. IEEE InternationalMay 2006.
Aziz et al "Interpolation Based Maximum-Likelihood(ML) Detection of Asynchronous Servo Repeatable Run Out (RRO) Data", Digest, IEEE Intl Magnetics Conf. vol. 42, No. 10 Oct. 2006.
Kryder, M. et al "Heat Assisted Magnetic Recording" Proc. IEEE, vol. 96, No. 11, p. 1810, Nov. 2008.
Weller et al "Thermal Limits in Ultrahigh-density Magnetic Recording" IEEE Trans. Magn. vol. 35, No. 6, p. 4423, Nov. 1999.

* cited by examiner

| Preamble 11 | SAM 12 | Wedge ID 13 | Gray Code 14 | Burst A 30 | Burst B 31 | Burst C 32 | Burst D 33 |

| | Servo Data 10a | User Data 16 | Servo Data 10b | |

SYSTEMS AND METHODS FOR SERVO DATA DETECTION

BACKGROUND OF THE INVENTION

The present inventions are related to systems and methods for data processing, and more particularly to systems and methods for servo data detection.

Data storage devices often include servo data regions interspersed with user data regions. The servo data regions include a variety of data that may be used for location identification and clock synchronization. It is desired to increase the density of the information maintained in the servo regions to allow for increased storage space supported by a given data storage device. Such an increase in the density of the information in the servo regions reduces the signal to noise ratio for data retrieved from the servo regions, and exacerbates problems with radial incoherence and flaws in timing recovery. This reduction in the signal to noise ratio may result in a decreased ability to correctly access the data from the servo regions and degraded storage operation.

Hence, for at least the aforementioned reasons, there exists a need in the art for advanced systems and methods for stored data processing.

BRIEF SUMMARY OF THE INVENTION

The present inventions are related to systems and methods for data processing, and more particularly to systems and methods for servo data detection.

Various embodiments of the present invention provide data processing circuits that include a codeword detector circuit operable to apply a codeword based data detection algorithm to a data input corresponding to an encoded servo data region to yield a detected output, and a servo address mark processing circuit operable to identify a pre-defined pattern in the detected output. In some instances of the aforementioned embodiments, the data processing circuit is implemented as an integrated circuit. In various instances of the aforementioned embodiments, the data processing circuit is implemented as part of a data storage device. In some cases, the encoded servo data region includes a wide bi-phase servo address mark.

In one or more instances of the aforementioned embodiments, the circuit further includes: an analog to digital converter circuit operable to provide a series of digital samples corresponding to an analog input signal. In such instances, the series of digital samples is the data input. In other instances of the aforementioned embodiments, the circuit further includes an analog to digital converter circuit operable to provide a series of digital samples corresponding to an analog input signal, and a digital filter circuit operable to filter the series of digital samples to yield a filtered output. In such instances, the filtered output is the data input.

In some instances of the aforementioned embodiments, the codeword based data detection algorithm includes calculating a first Euclidean distance between an ideal pattern and a codeword received as part of the data input for a first detector branch, and calculating a second Euclidean distance between the ideal pattern and a codeword received as part of the data input for a second detector branch. In some such instances, the circuit further includes a storage device holding the ideal pattern. The storage device is coupled to the codeword detector circuit. In various cases, the ideal pattern is programmable, while in other cases, the ideal pattern is adapted based upon servo address mark data. In particular cases, the codeword based data detection algorithm further includes selecting the detected output as the value represented by either the first detector branch or the second detector branch that corresponds to the smaller of the first Euclidean distance and the second Euclidean distance.

In one or more instances of the aforementioned embodiments, the codeword based data detection algorithm includes calculating a first absolute value based distance between an ideal pattern and a codeword received as part of the data input for a first detector branch, and calculating a second absolute value based distance between the ideal pattern and a codeword received as part of the data input for a second detector branch; and selecting the detected output as the value represented by either the first detector branch or the second detector branch that corresponds to the smaller of the first absolute value based distance and the second absolute value based distance.

In various instances of the aforementioned embodiments, the codeword based data detection algorithm includes: calculating a first Euclidean distance between a first ideal pattern and a codeword received as part of the data input for a first detector branch, and calculating a second Euclidean distance between the first ideal pattern and a codeword received as part of the data input for a second detector branch; and calculating a third Euclidean distance between a second ideal pattern and a codeword received as part of the data input for the first detector branch, and calculating a fourth Euclidean distance between the second ideal pattern and a codeword received as part of the data input for the second detector branch. The first ideal pattern corresponds to a first phase offset, and the second ideal pattern corresponds to a second phase offset. The codeword based data detection algorithm further includes selecting a processing phase as either the first phase offset or the second phase offset that corresponds to the smaller of the first Euclidean distance, the second Euclidean distance, the third Euclidean distance, and the fourth Euclidean distance; and selecting the detected output as the value corresponding the processing phase and the smaller of the Euclidean distances related to the processing phase.

In other instances of the aforementioned embodiments, the codeword based data detection algorithm includes: calculating a first absolute value based distance between a first ideal pattern and a codeword received as part of the data input for a first detector branch, and calculating a second absolute value based distance between the first ideal pattern and a codeword received as part of the data input for a second detector branch; and calculating a third absolute value based distance between a second ideal pattern and a codeword received as part of the data input for the first detector branch, and calculating a fourth absolute value based distance between the second ideal pattern and a codeword received as part of the data input for the second detector branch. The first ideal pattern corresponds to a first phase offset, and the second ideal pattern corresponds to a second phase offset. The codeword based data detection algorithm further includes selecting a processing phase as either the first phase offset or the second phase offset that corresponds to the smaller of the first absolute value based distance, the second absolute value based distance, the third absolute value based distance, and the fourth absolute value based distance; and selecting the detected output as the value corresponding the processing phase and the smaller of the absolute value based distances related to the processing phase.

Yet other embodiments of the present invention provide methods for processing servo data. The methods include: receiving digital samples corresponding to servo data on a storage medium; calculating a first distance between a derivative of the digital samples and an ideal pattern; and calculating a second distance between the derivative of the digital samples and the ideal pattern. The first distance corresponds to a first detector branch, and the second distance corresponds to a second detector branch. The methods further include selecting either the first detector branch or the second detector branch corresponding to smaller of the first distance and the second distance; and providing a detected output corresponding to the selected one of the first detector branch and the second detector branch. In some cases, the calculated distances are Euclidean distances. In other cases, the calculated distances are absolute value based distances.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data processing, and more particularly to systems and methods for servo data detection.

Figure 1:
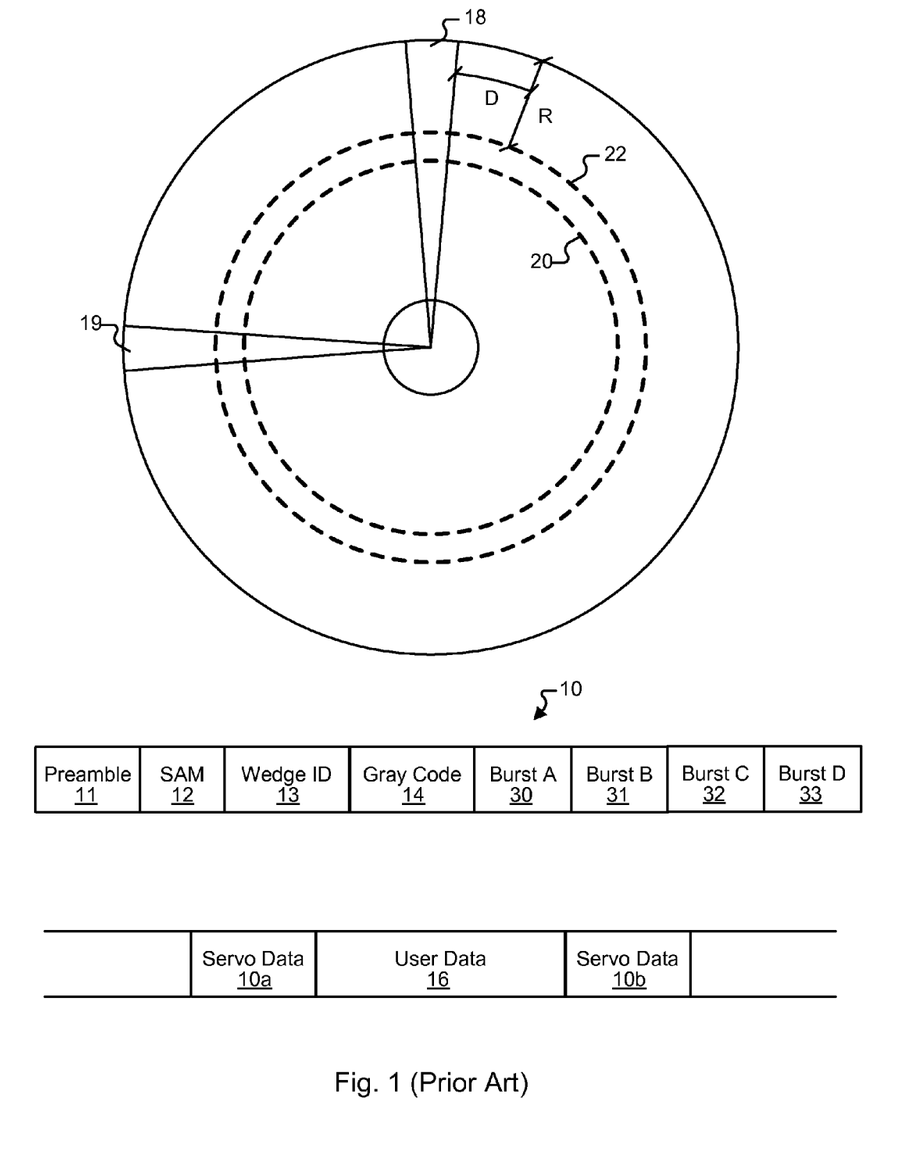
FIG. 1 is a block diagram of a known magnetic storage medium and sector data scheme.

Turning to FIG. 1, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, this servo data generally includes a preamble pattern 11 followed by a servo address mark 12 (SAM). Servo address mark 12 is followed by a wedge ID information field 13 and a Gray code 14. Gray code 14 is followed by one or more burst information fields 30, 31, 32, 33. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information fields 30, 31, 32, 33. Between the servo data bit patterns 10a and 10b, a user data region 16 is provided. There may be two types of servo burst—the first is called amplitude split servo bursts that can include four to six bursts written with certain offset to servo track, and the second is called null bursts.

Figure 2:
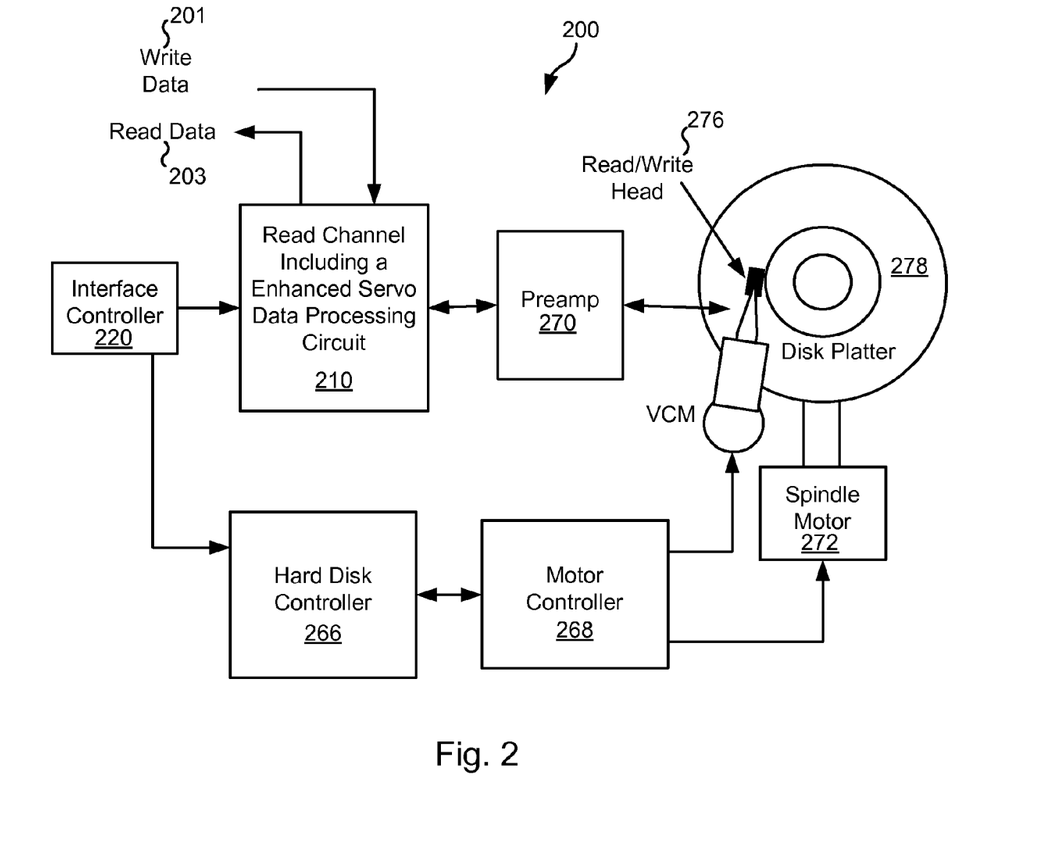
FIG. 2 shows a storage system including a read channel circuit with an enhanced servo data processing circuit in accordance with some embodiments of the present invention.

Turning to FIG. 2, a storage system 200 including a read channel circuit 210 with an enhanced servo data processing circuit is shown in accordance with some embodiments of the present invention. Storage system 200 may be, for example, a hard disk drive. Storage system 200 also includes a preamplifier 270, an interface controller 220, a hard disk controller 266, a motor controller 268, a spindle motor 272, a disk platter 278, and a read/write head 276. Interface controller 220 controls addressing and timing of data to/from disk platter 278. The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, read/write head assembly 276 is accurately positioned by motor controller 268 over a desired data track on disk platter 278. The desired track is identified in part using the enhanced servo data processing circuit. Motor controller 268 both positions read/write head assembly 276 in relation to disk platter 278 and drives spindle motor 272 by moving read/write head assembly to the proper data track on disk platter 278 under the direction of hard disk controller 266. Spindle motor 272 spins disk platter 278 at a determined spin rate (RPMs). Once read/write head assembly 278 is positioned adjacent the proper data track, magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel module 264 via preamplifier 270. Preamplifier 270 is operable to amplify the minute analog signals accessed from disk platter 278. In turn, read channel circuit 210 decodes and digitizes the received analog signal to recreate the information originally written to disk platter 278. This data is provided as read data 203 to a receiving circuit. As part of decoding the received information, read channel circuit 210 performs timing recovery on the received data stream using a reduced format timing recovery circuit. The enhanced servo data processing circuit may be implemented similar to that described below in relation to FIG. 3, FIG. 4, and/or FIG. 5, and/or may operate in accordance with the method discussed below in relation to FIG. 6. A write operation is substantially the opposite of the preceding read operation with write data 201 being provided to read channel circuit 210. This data is then encoded and written to disk platter 278.

It should be noted that storage system 200 may be integrated into a larger storage system such as, for example, a RAID (redundant array of inexpensive disks or redundant array of independent disks) based storage system. It should also be noted that various functions or blocks of storage system 200 may be implemented in either software or firmware, while other functions or blocks are implemented in hardware.

Figure 3:
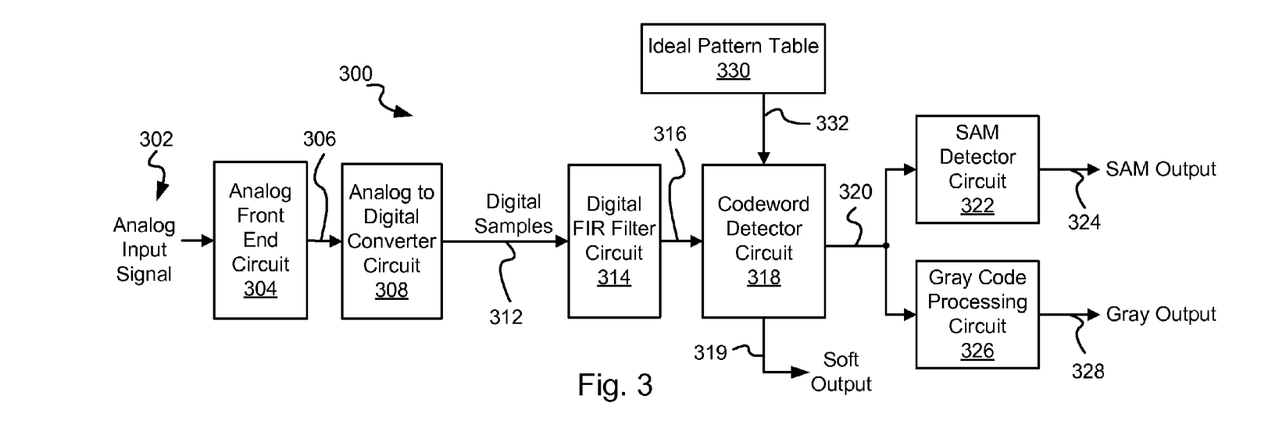
FIG. 3 depicts an enhanced servo data processing circuit in accordance with one or more embodiments of the present invention.

Turning to FIG. 3, an enhanced servo data processing circuit 300 is depicted in accordance with one or more embodiments of the present invention. Enhanced servo data processing circuit 300 includes an analog front end circuit 304 that receives an analog input signal 302 and provides a corresponding analog output signal 306. Analog front end circuit 304 may include any circuitry known in the art that is capable of receiving an analog input signal and providing a modified analog signal as an output. In one particular instance, analog front end circuit 304 includes an amplifier (not shown) that receives and amplifies analog input signal 302 and an analog filter (not shown) that reduces any noise exhibited at the output of the amplifier. Based upon the disclosure provided herein, one of ordinary skill in the art will recognize a variety of circuitry that may be included in analog front end circuit 304 in accordance with different embodiments of the present invention.

Analog output signal 306 is provided to an analog to digital converter circuit 308. Analog to digital converter circuit 308 provides a series of digital samples 312 representing analog output signal 306. Digital samples 312 are synchronized to a sample clock (not shown) that is provided to analog to digital converter circuit 308. Analog to digital converter circuit 308 may be any circuit or system known in the art that is capable of converting a continuous signal into a series of digital samples. Analog input signal 306 is a continuous signal representing a number of bit periods. The bit periods recur with a periodicity of T, and the sample clock causes analog to digital converter circuit 308 to generate a number of samples of analog input signal 302 for each period T. In one particular embodiment of the present invention, four samples are generated for each period T. In another embodiment of the present invention, eight samples are generated for each period T. It should be noted that other numbers of samples per period may be generated. Based upon the disclosure provided herein, one of ordinary skill in the art will recognize a variety of sampling frequencies and corresponding bit periods that may be used in relation to different embodiments of the present invention. Analog input signal 302 may be derived from a variety of sources. For example, analog input signal 302 may be received from a read/write head assembly (not shown) disposed in relation to a storage medium (not shown). As another example, analog input signal 302 may be derived from a receiver circuit (not shown) that is receiving a wireless transmission. Based upon the disclosure provided herein, one of ordinary skill in the art will recognize a variety of other sources of analog input signal 302.

Digital samples 312 are provided to a digital finite impulse response (FIR) filter circuit 314 that filters the received input and provides a corresponding filtered output 316. The digital filter circuit 314 may be implemented using any digital filtering architecture or approach known in the art. In some cases, the taps for filter circuit 314 are fixed and written with expected optimum values. In other cases, the taps for filter circuit 314 are adapted using a least mean square algorithm over the entirety of a servo address mark pattern and/or a Gray code pattern received by the circuit with an equalization target is assumed. Filtered output 316 is provided to a codeword detector circuit 318 that is operable to perform a codeword detection based upon a calculated distance from an ideal pattern 332. Ideal pattern 332 is provide from an ideal pattern table 330 that is pre-programmed to include ideal outputs based upon outputs expected where the phase is aligned. In other cases, ideal pattern table 330 may provide expected ideal pattern values that are adaptively calculated during operation of data processing circuit 300. Ideal pattern 332 may be a subset of a preamble, servo address mark and/or gray code fields that may be used to identify particular portions of the fields. For example, in one embodiment of the present invention the data received as analog input signal 302 corresponding to the servo data region the data may be wide bi-phase encoded.

In some cases, the received data is wide bi-phase encoded. In one case of wide bi-phase encoding a '0' is represented by the pattern '1100', and a '1' is represented by the pattern '0011'. In such cases, ideal pattern 332 is an ideal wide bi-phase encoded output corresponding to a preamble pattern. For example, ideal pattern 332 may be stored as a series of digital values expected as filtered output 316 from filter circuit 314 that correspond to the following binary representations: '11001100', '11000011', '00111100', '00110011' which corresponding to '11', '10', '01', '00', respectively.

Codeword detector circuit 318 calculates a Euclidean distance between an input pattern received as filtered output 316 and ideal pattern 332. In particular, a sequence of digital values received as filtered output are subtracted from corresponding values in ideal output 332, and the difference is squared. The sum of the squared difference for each value corresponding to each bit position (i.e., for a wide bi-phase encoded codeword with four values representing each bit position the squared difference corresponding to each of the four values are summed) in accordance with the following equations:

$$\text{Euclidean Distance}_{(State0 \to State0)} = \sum_{j=1}^{4} [\text{Filtered Output} 316(i, j) - \text{IdealPattern}_{(State0 \to State0)}(j)]^2,$$

$$\text{Euclidean Distance}_{(State1 \to State0)} = \sum_{j=1}^{4} [\text{Filtered Output } 316(i, j) - \text{IdealPattern}_{(State1 \to State0)}(j)]^2,$$

$$\text{Euclidean Distance}_{(State0 \to State1)} = \sum_{j=1}^{4} [\text{Filtered Output} 316(i, j) - \text{IdealPattern}_{(State0 \to State1)}(j)]^2,$$

and $$\text{Euclidean Distance}_{(State1 \to State1)} = \sum_{j=1}^{4} [\text{Filtered Output } 316(i, j) - \text{IdealPattern}_{(State1 \to State1)}(j)]^2.$$

In the preceding Euclidean distance equations the identifier (State 0→State 0) indicates a change from State 0 at a time index i−1 to State 0 at a time index i; the identifier (State 0→State 1) indicates a change from State 0 at a time index i−1 to State 1 at a time index i; the identifier (State 1→State 0) indicates a change from State 1 at a time index i−1 to State 0 at a time index i; and the identifier (State 1→State 1) indicates a change from State 1 at a time index i−1 to State 1 at a time index i.

Codeword detector circuit 318 then determines a first and second state metrics corresponding to a transition from a prior zero state to a subsequent state (i.e., indicated by i−1) by adding a prior state metric corresponding to a transition from a zero state to the current state and corresponding to a transition from a prior one state to a subsequent state (i.e., indicated by i−1) by adding a prior state metric corresponding to a transition from a one state to the current state in accordance with the following equation:

First State Metric=Prior State Metric$_{(State0\ at\ time\ indexi-1)}$+Euclidean Distance$_{(State0 \to State0)}$, and Second State Metric=Prior State Metric$_{(State1\ at\ time\ indexi-1)}$+Euclidean Distance$_{(State1 \to State0)}$.

The minimum of the first state metric and the second state metric is selected as the state metric corresponding to a transition from a prior zero state to the current state (i.e., indicated by i). This state metric is referred to as the ZERO state metric. Similarly, codeword detector circuit 318 determines a third and fourth state metrics corresponding to a transition from a prior zero state to a subsequent state (i.e., indicated by i−1) by adding a prior state metric corresponding to a transition from a zero state to the current state and corresponding to a transition from a prior one state to a subsequent state (i.e., indicated by i−1) by adding a prior state metric corresponding to a transition from a one state to the current state in accordance with the following equation:

Third State Metric=Prior State Metric$_{(State0\ at\ time\ indexi-1)}$+Euclidean Distance$_{(State0 \rightarrow State1)}$, and Fourth State Metric=Prior State Metric$_{(State1\ at\ time\ indexi-1)}$+Euclidean Distance$_{(State1 \rightarrow State1)}$.

The minimum of the third state metric and the fourth state metric is selected as the state metric corresponding to a transition from a prior one state to the current state (i.e., indicated by i). This state metric is referred to as the ONE state metric.

The difference between the aforementioned state metrics is calculated by codeword detector circuit 318 and provided as a soft output 319 (i.e., as an indicator of a likelihood that the appropriate next state was detected). Soft output 319 where the selected next state is the zero state is calculated in accordance with the following equation:

First Delta=Prior State Metric$_{(State0\ at\ time\ indexi-1)}$+ Euclidean Distance$_{(State0 \rightarrow State0)}$−Prior State Metric$_{(State1\ at\ time\ indexi-1)}$+Euclidean Distance$_{(State1 \rightarrow State0)}$.

Similarly, soft output 319 where the selected next state is the one state is calculated in accordance with the following equation:

Second Delta=Prior State Metric$_{(State0\ at\ time\ indexi-1)}$+ Euclidean Distance$_{(State0 \rightarrow State1)}$−Prior State Metric$_{(State1\ at\ time\ indexi-1)}$+Euclidean Distance$_{(State1 \rightarrow State1)}$.

Based upon the aforementioned calculations, codeword detector circuit 318 provides a data output 320 in accordance with the following pseudo-code:

```
If ( [(OneStateMetric − ZeroStateMetric) > 0 & & First Delta < 0] OR
     [(OneStateMetric − ZeroStateMetric) < 0 & & Second Delta < 0] )
{
    Data Output 320 = '0' (corresponding to a wide bi-phase '0011')
}
Else
{
    Data Output 320 = '1' (corresponding to a wide bi-phase '1100')
}
```

Output 320 is provided to a servo address mark detector circuit 322 and a Gray code processing circuit 326. Servo address mark detector circuit 322 may be any servo address mark detector circuit known in the art. In one particular embodiment of the present invention, servo address mark detector circuit 322 continually compares a series of the most recently received values of output 320 with a predefined or programmable servo address mark pattern to detect a match. When a match is detected, a SAM output 324 is asserted indicating a SAM found condition. Based upon the disclosure provided herein, one of ordinary skill in the art will recognize a variety of patterns that may be used as the servo address mark pattern. Gray code processing circuit 326 may be any Gray code processing circuit known in the art that is capable of performing Gray code processing on output 320 to yield a Gray code output 328 indicative of the status of the Gray code processing.

Of note, design complexity of codeword detector circuit 318 may be reduced by replacing the square terms in the Euclidean distance calculations with an absolute value calculation as shown in the following equations:

$$\text{Euclidean Distance}_{(State0 \rightarrow State0)} = \sum_{j=1}^{4} abs[\text{Filtered Output}316(i, j) - \text{IdealPattern}_{(State0 \rightarrow State0)}(j)],$$

$$\text{Euclidean Distance}_{(State1 \rightarrow State0)} = \sum_{j=1}^{4} abs[\text{Filtered Output}316(i, j) - \text{IdealPattern}_{(State1 \rightarrow State0)}(j)],$$

$$\text{Euclidean Distance}_{(State0 \rightarrow State1)} = \sum_{j=1}^{4} abs[\text{Filtered Output}316(i, j) - \text{IdealPattern}_{(State0 \rightarrow State1)}(j)],$$

and $$\text{Euclidean Distance}_{(State1 \rightarrow State1)} = \sum_{j=1}^{4} abs[\text{Filtered Output}316(i, j) - \text{IdealPattern}_{(State1 \rightarrow State1)}(j)].$$

The above mentioned detection algorithm implemented by codeword detector circuit 318 operates well in the presence of radial incoherence and/or substantial phase/frequency offset. In the preceding Euclidean distance equations the identifier (State 0→State 0) indicates a change from State 0 at a time index i−1 to State 0 at a time index i; the identifier (State 0→State 1) indicates a change from State 0 at a time index i−1 to State 1 at a time index i; the identifier (State 1→State 0) indicates a change from State 1 at a time index i−1 to State 0 at a time index i; and the identifier (State 1→State 1) indicates a change from State 1 at a time index i−1 to State 1 at a time index i.

Figure 4:
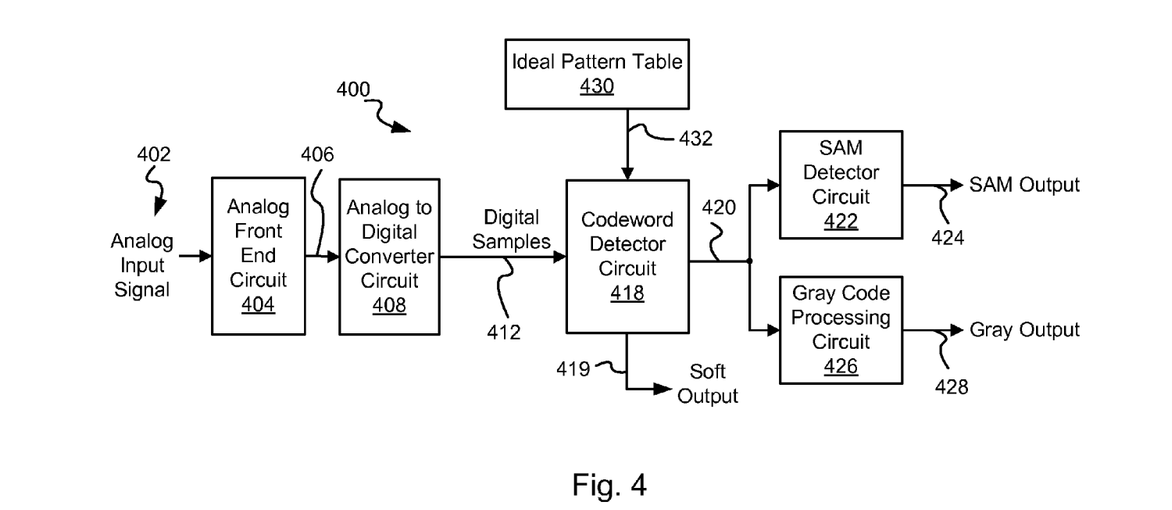
FIG. 4 shows another enhanced servo data processing circuit in accordance with some embodiments of the present invention.

Turning to FIG. 4, another enhanced servo data processing circuit 400 operating without a digital filter is depicted in accordance with one or more embodiments of the present invention. Enhanced servo data processing circuit 400 includes an analog front end circuit 404 that receives an analog input signal 402 and provides a corresponding analog output signal 406. Analog front end circuit 404 may include any circuitry known in the art that is capable of receiving an analog input signal and providing a modified analog signal as an output. In one particular instance, analog front end circuit 404 includes an amplifier (not shown) that receives and amplifies analog input signal 402 and an analog filter (not shown) that reduces any noise exhibited at the output of the amplifier. Based upon the disclosure provided herein, one of ordinary skill in the art will recognize a variety of circuitry that may be included in analog front end circuit 404 in accordance with different embodiments of the present invention.

Analog output signal 406 is provided to an analog to digital converter circuit 408. Analog to digital converter circuit 408 provides a series of digital samples 412 representing analog output signal 406. Digital samples 412 are synchronized to a sample clock (not shown) that is provided to analog to digital converter circuit 408. Analog to digital converter circuit 308 may be any circuit or system known in the art that is capable of converting a continuous signal into a series of digital samples. Analog input signal 406 is a continuous signal representing a number of bit periods. The bit periods recur with a periodicity of T, and the sample clock causes analog to digital converter circuit 408 to generate a number of samples of analog input signal 402 for each period T. In one particular embodiment of the present invention, four samples are generated for each period T. In another embodiment of the present invention, eight samples are generated for each period T. It should be noted that other numbers of samples per period may be generated. Based upon the disclosure provided herein, one of ordinary skill in the art will recognize a variety of sampling frequencies and corresponding bit periods that may be used in relation to different embodiments of the present invention. Analog input signal 302 may be derived from a variety of sources. For example, analog input signal 402 may be received from a read/write head assembly (not shown) disposed in relation to a storage medium (not shown). As another example, analog input signal 402 may be derived from a receiver circuit (not shown) that is receiving a wireless transmission. Based upon the disclosure provided herein, one of ordinary skill in the art will recognize a variety of other sources of analog input signal 402.

Digital samples 412 are provided to a codeword detector circuit 418 that is operable to perform a codeword detection based upon a calculated distance from an ideal pattern 432. Ideal pattern 432 is provide from an ideal pattern table 430 that is pre-programmed to include ideal outputs based upon outputs expected where the phase is aligned. In other cases, ideal pattern table 430 may provide expected ideal pattern values that are adaptively calculated during operation of data processing circuit 400. Ideal pattern 432 may be a subset of a preamble, servo address mark and/or gray code fields that may be used to identify particular portions of the fields. For example, in one embodiment of the present invention the data received as analog input signal 402 corresponding to the servo data region the data may be wide bi-phase encoded.

In some cases, the received data is wide bi-phase encoded. In one case of wide bi-phase encoding a '0' is represented by the pattern '1100', and a '1' is represented by the pattern '0011'. In such cases, ideal pattern 432 is an ideal wide bi-phase encoded output corresponding to a preamble pattern. For example, ideal pattern 432 may be stored as a series of digital values expected as filtered output 416 from filter circuit 414 that correspond to the following binary representations: '11001100', '11000011', '00111100', '00110011' which corresponding to '11', '10', '01', '00', respectively.

Codeword detector circuit 418 calculates a Euclidean distance between an input pattern received as filtered output 416 and ideal pattern 432. In particular, a sequence of digital values received as filtered output are subtracted from corresponding values in ideal output 432, and the difference is squared. The sum of the squared difference for each value corresponding to each bit position (i.e., for a wide bi-phase encoded codeword with four values representing each bit position the squared difference corresponding to each of the four values are summed) in accordance with the following equations:

$$\text{Euclidean Distance}_{(State0 \to State0)} = \sum_{j=1}^{4} [\text{Filtered Output} 416(i, j) - \text{IdealPattern}_{(State0 \to State0)}(j)]^2,$$

$$\text{Euclidean Distance}_{(State1 \to State0)} = \sum_{j=1}^{4} [\text{Filtered Output } 416(i, j) - \text{IdealPattern}_{(State1 \to State0)}(j)]^2,$$

$$\text{Euclidean Distance}_{(State0 \to State1)} = \sum_{j=1}^{4} [\text{Filtered Output} 416(i, j) - \text{IdealPattern}_{(State0 \to State1)}(j)]^2,$$

and $$\text{Euclidean Distance}_{(State1 \to State1)} = \sum_{j=1}^{4} [\text{Filtered Output } 416(i, j) - \text{IdealPattern}_{(State1 \to State1)}(j)]^2.$$

In the preceding Euclidean distance equations the identifier (State 0→State 0) indicates a change from State 0 at a time index i−1 to State 0 at a time index i; the identifier (State 0→State 1) indicates a change from State 0 at a time index i−1 to State 1 at a time index i; the identifier (State 1→State 0) indicates a change from State 1 at a time index i−1 to State 0 at a time index i; and the identifier (State 1→State 1) indicates a change from State 1 at a time index i−1 to State 1 at a time index i.

Codeword detector circuit 418 then determines a first and second state metrics corresponding to a transition from a prior zero state to a subsequent state (i.e., indicated by i−1) by adding a prior state metric corresponding to a transition from a zero state to the current state and corresponding to a transition from a prior one state to a subsequent state (i.e., indicated by i−1) by adding a prior state metric corresponding to a transition from a one state to the current state in accordance with the following equation:

First State Metric=Prior State Metric$_{(State0\ at\ time\ index i-1)}$+Euclidean Distance$_{(State0 \to State0)}$, and Second State Metric=Prior State Metric$_{(State1\ at\ time\ index i-1)}$+Euclidean Distance$_{(State1 \to State0)}$.

The minimum of the first state metric and the second state metric is selected as the state metric corresponding to a transition from a prior zero state to the current state (i.e., indicated by i). This state metric is referred to as the ZERO state metric. Similarly, codeword detector circuit 418 determines a third and fourth state metrics corresponding to a transition from a prior zero state to a subsequent state (i.e., indicated by i−1) by adding a prior state metric corresponding to a transition from a zero state to the current state and corresponding to a transition from a prior one state to a subsequent state (i.e., indicated by i−1) by adding a prior state metric corresponding to a transition from a one state to the current state in accordance with the following equation:

Third State Metric=Prior State Metric$_{(State0\ at\ time\ index i-1)}$+Euclidean Distance$_{(State0 \to State1)}$, and Fourth State Metric=Prior State Metric$_{(State1\ at\ time\ index i-1)}$+Euclidean Distance$_{(State1 \to State1)}$.

The minimum of the third state metric and the fourth state metric is selected as the state metric corresponding to a transition from a prior one state to the current state (i.e., indicated by i). This state metric is referred to as the ONE state metric.

The difference between the aforementioned state metrics is calculated by codeword detector circuit 418 and provided as a soft output 419 (i.e., as an indicator of a likelihood that the appropriate next state was detected). Soft output 319 where the selected next state is the zero state is calculated in accordance with the following equation:

First Delta=Prior State Metric$_{(State0\ at\ time\ index\ i-1)}$+Euclidean Distance$_{(State0 \rightarrow State0)}$−Prior State Metric$_{(State1\ at\ time\ index\ i-1)}$+Euclidean Distance$_{(State1 \rightarrow State0)}$.

Similarly, soft output 319 where the selected next state is the one state is calculated in accordance with the following equation:

Second Delta=Prior State Metric$_{(State0\ at\ time\ index\ i-1)}$+Euclidean Distance$_{(State0 \rightarrow State1)}$−Prior State Metric$_{(State1\ at\ time\ index\ i-1)}$+Euclidean Distance$_{(State1 \rightarrow State1)}$.

Based upon the aforementioned calculations, codeword detector circuit 418 provides a data output 420 in accordance with the following pseudo-code:

```
If ( [(OneStateMetric − ZeroStateMetric) > 0 & & First Delta < 0] OR
     [(OneStateMetric − ZeroStateMetric) < 0 & & Second Delta < 0] )
{
    Data Output 420 = '0' (corresponding to a wide bi-phase '0011')
}
Else
{
    Data Output 420 = '1' (corresponding to a wide bi-phase '1100')
}
```

Output 420 is provided to a servo address mark detector circuit 422 and a Gray code processing circuit 426. Servo address mark detector circuit 422 may be any servo address mark detector circuit known in the art. In one particular embodiment of the present invention, servo address mark detector circuit 422 continually compares a series of the most recently received values of output 420 with a predefined or programmable servo address mark pattern to detect a match. When a match is detected, a SAM output 424 is asserted indicating a SAM found condition. Based upon the disclosure provided herein, one of ordinary skill in the art will recognize a variety of patterns that may be used as the servo address mark pattern. Gray code processing circuit 426 may be any Gray code processing circuit known in the art that is capable of performing Gray code processing on output 420 to yield a Gray code output 328 indicative of the status of the Gray code processing.

Design complexity of codeword detector circuit 418 may be reduced by replacing the square terms in the Euclidean distance calculations with an absolute value calculation as shown in the following equations:

$$\text{Euclidean Distance}_{(State0 \rightarrow State0)} = \sum_{j=1}^{4} \text{abs}[\text{Filtered Output}416(i, j) - \text{IdealPattern}_{(State0 \rightarrow State0)}(j)],$$

$$\text{Euclidean Distance}_{(State1 \rightarrow State0)} = \sum_{j=1}^{4} \text{abs}[\text{Filtered Output}416(i, j) - \text{IdealPattern}_{(State1 \rightarrow State0)}(j)],$$

-continued $$\text{Euclidean Distance}_{(State0 \rightarrow State1)} = \sum_{j=1}^{4} \text{abs}[\text{Filtered Output}416(i, j) - \text{IdealPattern}_{(State0 \rightarrow State1)}(j)],$$

and $$\text{Euclidean Distance}_{(State1 \rightarrow State1)} = \sum_{j=1}^{4} \text{abs}[\text{Filtered Output}416(i, j) - \text{IdealPattern}_{(State1 \rightarrow State1)}(j)].$$

The above mentioned detection algorithm implemented by codeword detector circuit 418 operates well in the presence of radial incoherence and/or substantial phase/frequency offset. In the preceding Euclidean distance equations the identifier (State 0→State 0) indicates a change from State 0 at a time index i−1 to State 0 at a time index i; the identifier (State 0→State 1) indicates a change from State 0 at a time index i−1 to State 1 at a time index i; the identifier (State 1→State 0) indicates a change from State 1 at a time index i−1 to State 0 at a time index i; and the identifier (State 1→State 1) indicates a change from State 1 at a time index i−1 to State 1 at a time index i.

Figure 5:
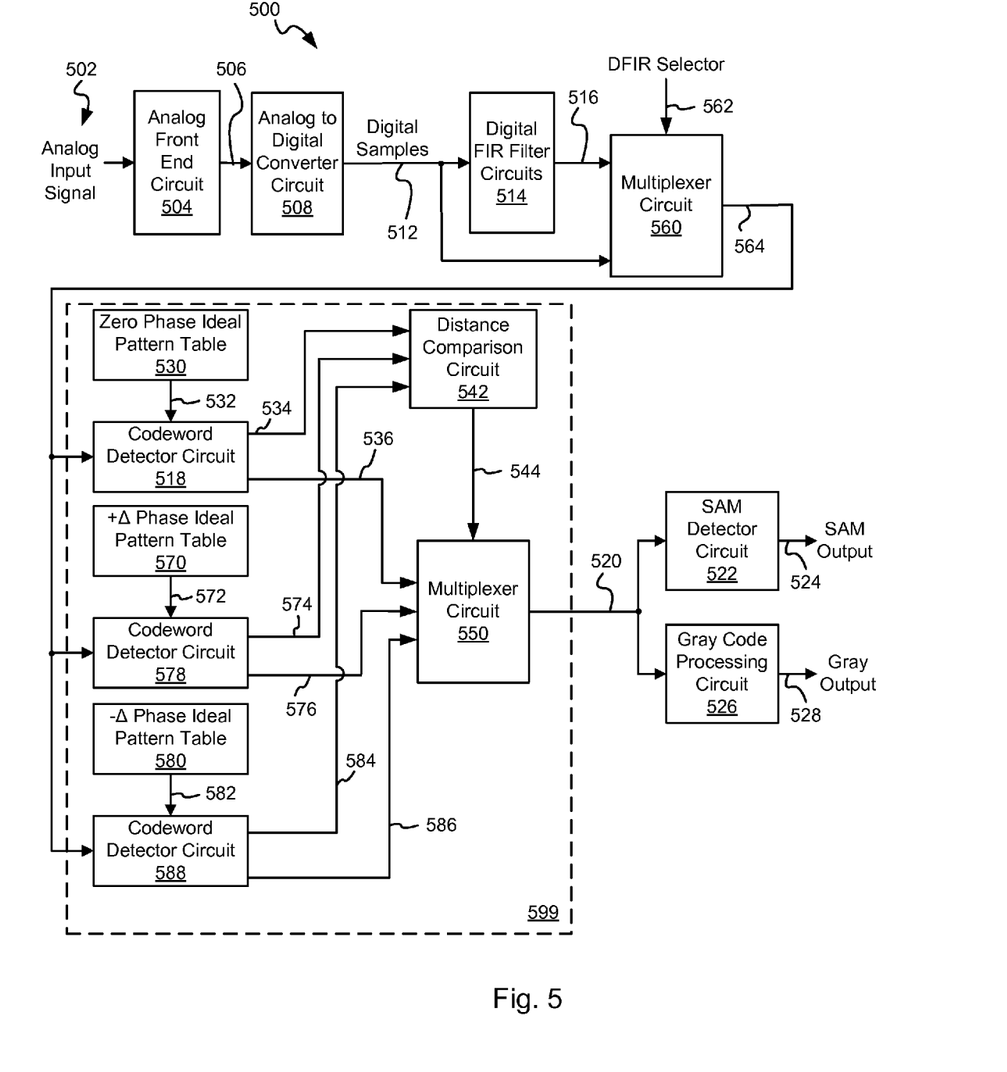
FIG. 5 depicts yet another enhanced servo data processing circuit in accordance with one or more embodiments of the present invention.

Turning to FIG. 5, yet another enhanced servo data processing circuit 500 is shown in accordance with other embodiments of the present invention. Servo data processing circuit 500 includes a multi-path codeword detector circuit 599 operable to perform detection at multiple phase offsets. Such an approach provides for increased robustness where large phase/frequency offsets may occur. Such a multi-path codeword detector circuit 599 uses multiple ideal patterns each corresponding to a different offset from ideal. The values of the ideal patterns are pre-computed and assume certain phase offset (e.g., delta) using linear interpolation or a variations of interpolation algorithm. These ideal patterns may be stored in look-up tables. For different servo density such as ID, MD and OD tracks as are known in the art, the ideal values can be different, and user can select the set of patterns through a programmable register. In other cases, an adaptive training algorithm can be used for on-the-fly training of Y ideal values. Such a training algorithm uses a SAM pattern as the training metric to update Y ideal values wedge by wedge.

Enhanced servo data processing circuit 500 includes an analog front end circuit 504 that receives an analog input signal 502 and provides a corresponding analog output signal 506. Analog front end circuit 504 may include any circuitry known in the art that is capable of receiving an analog input signal and providing a modified analog signal as an output. In one particular instance, analog front end circuit 504 includes an amplifier (not shown) that receives and amplifies analog input signal 502 and an analog filter (not shown) that reduces any noise exhibited at the output of the amplifier. Based upon the disclosure provided herein, one of ordinary skill in the art will recognize a variety of circuitry that may be included in analog front end circuit 504 in accordance with different embodiments of the present invention.

Analog output signal 506 is provided to an analog to digital converter circuit 508. Analog to digital converter circuit 508 provides a series of digital samples 512 representing analog output signal 506. Digital samples 512 are synchronized to a sample clock (not shown) that is provided to analog to digital converter circuit 508. Analog to digital converter circuit 508 may be any circuit or system known in the art that is capable of converting a continuous signal into a series of digital samples. Analog input signal 506 is a continuous signal representing a number of bit periods. The bit periods recur with a periodicity of T, and the sample clock causes analog to digital converter circuit 508 to generate a number of samples of analog input signal 502 for each period T. In one particular embodiment of the present invention, four samples are generated for each period T. In another embodiment of the present invention, eight samples are generated for each period T. It should be noted that other numbers of samples per period may be generated. Based upon the disclosure provided herein, one of ordinary skill in the art will recognize a variety of sampling frequencies and corresponding bit periods that may be used in relation to different embodiments of the present invention. Analog input signal 502 may be derived from a variety of sources. For example, analog input signal 502 may be received from a read/write head assembly (not shown) disposed in relation to a storage medium (not shown). As another example, analog input signal 502 may be derived from a receiver circuit (not shown) that is receiving a wireless transmission. Based upon the disclosure provided herein, one of ordinary skill in the art will recognize a variety of other sources of analog input signal 502.

Digital samples 512 are provided to a digital finite impulse response (FIR) filter circuit 514 that filters the received input and provides a corresponding filtered output 516. The digital filter circuit 514 may be implemented using any digital filtering architecture or approach known in the art. In some cases, the taps for filter circuit 514 are fixed and written with expected optimum values. In other cases, the taps for filter circuit 514 are adapted using a least mean square algorithm over the entirety of a servo address mark pattern and/or a Gray code pattern received by the circuit with an equalization target is assumed.

Both filtered output 516 and digital samples 512 are provided to a multiplexer circuit 560. Multiplexer circuit 560 provides either filtered output 516 or digital samples 512 as a selected output 564 depending upon a DFIR selector 562. DFIR selector 562 may be programmably set depending upon whether filtered data or the raw samples are to be used.

Selected output 564 is provided to multi-path codeword detector circuit 599 that is operable to perform codeword detection based upon calculated distances from various ideal patterns 532, 572, 582 each representing a phase offset from an ideal condition. In particular, multi-path codeword detector circuit 599 includes: a zero phase ideal pattern table 530 that is programmed with expected ideal pattern values corresponding to a zero phase offset, a positive delta phase ideal pattern table 570 that is programmed with expected ideal pattern values corresponding to a positive delta phase offset, and a negative delta phase ideal pattern table 580 that is programmed with expected ideal pattern values corresponding to a negative delta phase offset. Delta may be any offset from a zero or ideal phase point. Zero phase ideal pattern phase table 530 provides a zero phase offset ideal pattern 532 to a codeword detector circuit 518; positive delta phase ideal pattern table 570 provides a positive delta phase offset ideal pattern 572 to a codeword detector circuit 578; and negative delta phase ideal pattern table 580 provides a negative delta phase offset ideal pattern 582 to a codeword detector circuit 588.

Codeword detector circuit 518 operates similar to that described above in relation to codeword detector circuit 318. In some cases, the received data is wide bi-phase encoded. In one case of wide bi-phase encoding a '0' is represented by the pattern '1100', and a '1' is represented by the pattern '0011'. In such cases, ideal pattern 332 is an ideal wide bi-phase encoded output corresponding to a preamble pattern. For example, ideal pattern 332 may be stored as a series of digital values expected as filtered output 316 from filter circuit 314 that correspond to the following binary representations: '11001100', '11000011', '00111100', '00110011' which corresponding to '11', '10', '01', '00', respectively.

Codeword detector circuit 518 calculates a Euclidean distance between an input pattern received as selected output 564 and zero phase offset ideal pattern 532. In particular, a sequence of digital values received as filtered output are subtracted from corresponding values in zero phase offset ideal pattern 532, and the difference is squared. The sum of the squared difference for each value corresponding to each bit position (i.e., for a wide bi-phase encoded codeword with four values representing each bit position the squared difference corresponding to each of the four values are summed) in accordance with the following equations:

$$\text{Euclidean Distance}_{(State0 \to State0)} = \sum_{j=1}^{4} [\text{Selected Output} 564(i, j) - \text{IdealPattern}_{(State0 \to State0)}(j)]^2,$$

$$\text{Euclidean Distance}_{(State1 \to State0)} = \sum_{j=1}^{4} [\text{Selected Output} 564(i, j) - \text{IdealPattern}_{(State1 \to State0)}(j)]^2,$$

$$\text{Euclidean Distance}_{(State0 \to State1)} = \sum_{j=1}^{4} [\text{Selected Output} 564(i, j) - \text{IdealPattern}_{(State0 \to State1)}(j)]^2,$$

and $$\text{Euclidean Distance}_{(State1 \to State1)} = \sum_{j=1}^{4} [\text{Selected Output} 564(i, j) - \text{IdealPattern}_{(State1 \to State1)}(j)]^2.$$

In the preceding Euclidean distance equations the identifier (State 0→State 0) indicates a change from State 0 at a time index i−1 to State 0 at a time index i; the identifier (State 0→State 1) indicates a change from State 0 at a time index i−1 to State 1 at a time index i; the identifier (State 1→State 0) indicates a change from State 1 at a time index i−1 to State 0 at a time index i; and the identifier (State 1→State 1) indicates a change from State 1 at a time index i−1 to State 1 at a time index i.

Codeword detector circuit 518 then determines a first and second state metrics corresponding to a transition from a prior zero state to a subsequent state (i.e., indicated by i−1) by adding a prior state metric corresponding to a transition from a zero state to the current state and corresponding to a transition from a prior one state to a subsequent state (i.e., indicated by i−1) by adding a prior state metric corresponding to a transition from a one state to the current state in accordance with the following equation:

First State Metric=Prior State Metric$_{(State0\ at\ time\ index i-1)}$+Euclidean Distance$_{(State0 \to State0)}$, and Second State Metric=Prior State Metric$_{(State1\ at\ time\ index i-1)}$+Euclidean Distance$_{(State1 \to State0)}$.

The minimum of the first state metric and the second state metric is selected as the state metric corresponding to a transition from a prior zero state to the current state (i.e., indicated by i). This state metric is referred to as the ZERO state metric.

Similarly, codeword detector circuit 518 determines a third and fourth state metrics corresponding to a transition from a prior zero state to a subsequent state (i.e., indicated by i−1) by adding a prior state metric corresponding to a transition from a zero state to the current state and corresponding to a transition from a prior one state to a subsequent state (i.e., indicated by i−1) by adding a prior state metric corresponding to a transition from a one state to the current state in accordance with the following equation:

Third State Metric=Prior State Metric$_{(State0\ at\ time\ indexi-1)}$+Euclidean Distance$_{(State0 \rightarrow State1)}$, and Fourth State Metric=Prior State Metric$_{(State1\ at\ time\ indexi-1)}$+Euclidean Distance$_{(State1 \rightarrow State1)}$.

The minimum of the third state metric and the fourth state metric is selected as the state metric corresponding to a transition from a prior one state to the current state (i.e., indicated by i). This state metric is referred to as the ONE state metric.

The difference between the aforementioned state metrics is calculated by codeword detector circuit 518 and provided as a soft output (i.e., as an indicator of a likelihood that the appropriate next state was detected). The soft output where the selected next state is the zero state is calculated in accordance with the following equation:

First Delta=Prior State Metric$_{(State0\ at\ time\ indexi-1)}$+Euclidean Distance$_{(State0 \rightarrow State0)}$−Prior State Metric$_{(State1\ at\ time\ indexi-1)}$+Euclidean Distance$_{(State1 \rightarrow State0)}$.

Similarly, soft output 319 where the selected next state is the one state is calculated in accordance with the following equation:

Second Delta=Prior State Metric$_{(State0\ at\ time\ indexi-1)}$+Euclidean Distance$_{(State0 \rightarrow State1)}$−Prior State Metric$_{(State1\ at\ time\ indexi-1)}$+Euclidean Distance$_{(State1 \rightarrow State1)}$.

Based upon the aforementioned calculations, codeword detector circuit 518 provides a data output 536 in accordance with the following pseudo-code:

```
If ( [(OneStateMetric − ZeroStateMetric) > 0 & & First Delta < 0] OR
    [(OneStateMetric − ZeroStateMetric) < 0 & & Second Delta < 0] )
{
    Data Output 536 = '0' (corresponding to a wide bi-phase '0011')
}
Else
{
    Data Output 536 = '1' (corresponding to a wide bi-phase '1100')
}
```

Data output 536 is provided to a multiplexer circuit 550. In addition, the calculated Euclidean distance corresponding to the selected data output is provided as a distance output 534 to a distance comparison circuit 542.

Codeword detector circuit 578 also operates similar to that described above in relation to codeword detector circuit 318 except that the ideal pattern is a positive delta offset ideal pattern. Codeword detector circuit 578 calculates a Euclidean distance between an input pattern received as selected output 564 and positive delta phase offset ideal pattern 572. In particular, a sequence of digital values received as filtered output are subtracted from corresponding values in positive delta phase offset ideal pattern 572, and the difference is squared. The sum of the squared difference for each value corresponding to each bit position (i.e., for a wide bi-phase encoded codeword with four values representing each bit position the squared difference corresponding to each of the four values are summed) in accordance with the following equations:

$$\text{Euclidean Distance}_{(State0 \rightarrow State0)} = \sum_{j=1}^{4} [\text{Selected Output}564(i, j) - \text{IdealPattern}_{(State0 \rightarrow State0)}(j)]^2,$$

$$\text{Euclidean Distance}_{(State1 \rightarrow State0)} = \sum_{j=1}^{4} [\text{Selected Output}564(i, j) - \text{IdealPattern}_{(State1 \rightarrow State0)}(j)]^2,$$

$$\text{Euclidean Distance}_{(State0 \rightarrow State1)} = \sum_{j=1}^{4} [\text{Selected Output}564(i, j) - \text{IdealPattern}_{(State0 \rightarrow State1)}(j)]^2,$$

and $$\text{Euclidean Distance}_{(State1 \rightarrow State1)} = \sum_{j=1}^{4} [\text{Selected Output}564(i, j) - \text{IdealPattern}_{(State1 \rightarrow State1)}(j)]^2.$$

In the preceding Euclidean distance equations the identifier (State 0→State 0) indicates a change from State 0 at a time index i−1 to State 0 at a time index i; the identifier (State 0→State 1) indicates a change from State 0 at a time index i−1 to State 1 at a time index i; the identifier (State 1→State 0) indicates a change from State 1 at a time index i−1 to State 0 at a time index i; and the identifier (State 1→State 1) indicates a change from State 1 at a time index i−1 to State 1 at a time index i.

Codeword detector circuit 578 then determines a first and second state metrics corresponding to a transition from a prior zero state to a subsequent state (i.e., indicated by i−1) by adding a prior state metric corresponding to a transition from a zero state to the current state and corresponding to a transition from a prior one state to a subsequent state (i.e., indicated by i−1) by adding a prior state metric corresponding to a transition from a one state to the current state in accordance with the following equation:

First State Metric=Prior State Metric$_{(State0\ at\ time\ indexi-1)}$+Euclidean Distance$_{(State0 \rightarrow State0)}$, and Second State Metric=Prior State Metric$_{(State1\ at\ time\ indexi-1)}$+Euclidean Distance$_{(State1 \rightarrow State0)}$.

The minimum of the first state metric and the second state metric is selected as the state metric corresponding to a transition from a prior zero state to the current state (i.e., indicated by i). This state metric is referred to as the ZERO state metric. Similarly, codeword detector circuit 578 determines a third and fourth state metrics corresponding to a transition from a prior zero state to a subsequent state (i.e., indicated by i−1) by adding a prior state metric corresponding to a transition from a zero state to the current state and corresponding to a transition from a prior one state to a subsequent state (i.e., indicated by i−1) by adding a prior state metric corresponding to a transition from a one state to the current state in accordance with the following equation:

Third State Metric=Prior State Metric$_{(State0\ at\ time\ indexi-1)}$+Euclidean Distance$_{(State0 \rightarrow State1)}$, and Fourth State Metric=Prior State Metric$_{(State1\ at\ time\ indexi-1)}$+Euclidean Distance$_{(State1 \rightarrow State1)}$, and The minimum of the third state metric and the fourth state metric is selected as the state metric corresponding to a transition from a prior one state to the current state (i.e., indicated by i). This state metric is referred to as the ONE state metric.

The difference between the aforementioned state metrics is calculated by codeword detector circuit 578 and provided as a soft output (i.e., as an indicator of a likelihood that the appropriate next state was detected). The soft output where the selected next state is the zero state is calculated in accordance with the following equation:

First Delta=Prior State Metric$_{(State0\ at\ time\ indexi-1)}$+Euclidean Distance$_{(State0\rightarrow State0)}$−Prior State Metric$_{(State1\ at\ time\ indexi-1)}$+Euclidean Distance$_{(State1\rightarrow State0)}$.

Similarly, the soft output where the selected next state is the one state is calculated in accordance with the following equation:

Second Delta=Prior State Metric$_{(State0\ at\ time\ indexi-1)}$+Euclidean Distance$_{(State0\rightarrow State1)}$−Prior State Metric$_{(State1\ at\ time\ indexi-1)}$+Euclidean Distance$_{(State1\rightarrow State1)}$.

Based upon the aforementioned calculations, codeword detector circuit 578 provides a data output 576 in accordance with the following pseudo-code:

```
If ( [(OneStateMetric − ZeroStateMetric) > 0 & & First Delta < 0] OR
    [(OneStateMetric − ZeroStateMetric) < 0 & & Second Delta < 0] )
{
    Data Output 576 = '0' (corresponding to a wide bi-phase '0011')
}
Else
{
    Data Output 576 = '1' (corresponding to a wide bi-phase '1100')
}
```

Data output 576 is provided to a multiplexer circuit 550. In addition, the calculated Euclidean distance corresponding to the selected data output is provided as a distance output 574 to a distance comparison circuit 542.

Codeword detector circuit 588 also operates similar to that described above in relation to codeword detector circuit 318 except that the ideal pattern is a negative delta offset ideal pattern. Codeword detector circuit 588 calculates a Euclidean distance between an input pattern received as selected output 564 and negative delta phase offset ideal pattern 582. In particular, a sequence of digital values received as filtered output are subtracted from corresponding values in negative delta phase offset ideal pattern 582, and the difference is squared. The sum of the squared difference for each value corresponding to each bit position (i.e., for a wide bi-phase encoded codeword with four values representing each bit position the squared difference corresponding to each of the four values are summed) in accordance with the following equations:

$$\text{Euclidean Distance}_{(State0\rightarrow State0)} = \sum_{j=1}^{4} [\text{Selected Output}564(i,\ j) - \text{IdealPattern}_{(State0\rightarrow State0)}(j)]^2,$$

$$\text{Euclidean Distance}_{(State1\rightarrow State0)} = \sum_{j=1}^{4} [\text{Selected Output } 564(i,\ j) - \text{IdealPattern}_{(State1\rightarrow State0)}(j)]^2,$$

$$\text{Euclidean Distance}_{(State0\rightarrow State1)} = \sum_{j=1}^{4} [\text{Selected Output}564(i,\ j) - \text{IdealPattern}_{(State0\rightarrow State1)}(j)]^2,$$

and $$\text{Euclidean Distance}_{(State1\rightarrow State1)} = \sum_{j=1}^{4} [\text{Selected Output } 564(i,\ j) - \text{IdealPattern}_{(State1\rightarrow State1)}(j)]^2.$$

In the preceding Euclidean distance equations the identifier (State 0→State 0) indicates a change from State 0 at a time index i−1 to State 0 at a time index i; the identifier (State 0→State 1) indicates a change from State 0 at a time index i−1 to State 1 at a time index i; the identifier (State 1→State 0) indicates a change from State 1 at a time index i−1 to State 0 at a time index i; and the identifier (State 1→State 1) indicates a change from State 1 at a time index i−1 to State 1 at a time index i.

Codeword detector circuit 588 then determines a first and second state metrics corresponding to a transition from a prior zero state to a subsequent state (i.e., indicated by i−1) by adding a prior state metric corresponding to a transition from a zero state to the current state and corresponding to a transition from a prior one state to a subsequent state (i.e., indicated by i−1) by adding a prior state metric corresponding to a transition from a one state to the current state in accordance with the following equation:

First State Metric=Prior State Metric$_{(State0\ at\ time\ indexi-1)}$+Euclidean Distance$_{(State0\rightarrow State0)}$, and Second State Metric=Prior State Metric$_{(State1\ at\ time\ indexi-1)}$+Euclidean Distance$_{(State1\rightarrow State0)}$.

The minimum of the first state metric and the second state metric is selected as the state metric corresponding to a transition from a prior zero state to the current state (i.e., indicated by i). This state metric is referred to as the ZERO state metric. Similarly, codeword detector circuit 588 determines a third and fourth state metrics corresponding to a transition from a prior zero state to a subsequent state (i.e., indicated by i−1) by adding a prior state metric corresponding to a transition from a zero state to the current state and corresponding to a transition from a prior one state to a subsequent state (i.e., indicated by i−1) by adding a prior state metric corresponding to a transition from a one state to the current state in accordance with the following equation:

Third State Metric=Prior State Metric$_{(State0\ at\ time\ indexi-1)}$+Euclidean Distance$_{(State0\rightarrow State1)}$, and Fourth State Metric=Prior State Metric$_{(State1\ at\ time\ indexi-1)}$+Euclidean Distance$_{(State1\rightarrow State1)}$.

The minimum of the third state metric and the fourth state metric is selected as the state metric corresponding to a transition from a prior one state to the current state (i.e., indicated by i). This state metric is referred to as the ONE state metric.

The difference between the aforementioned state metrics is calculated by codeword detector circuit 588 and provided as a soft output (i.e., as an indicator of a likelihood that the appropriate next state was detected). The soft output where the selected next state is the zero state is calculated in accordance with the following equation:

First Delta=Prior State Metric$_{(State0\ at\ time\ indexi-1)}$+
Euclidean Distance$_{(State0 \rightarrow State0)}$−Prior State
Metric$_{(State1\ at\ time\ indexi-1)}$+Euclidean
Distance$_{(State1 \rightarrow State0)}$.

Similarly, the soft output where the selected next state is the one state is calculated in accordance with the following equation:

Second Delta=Prior State
Metric$_{(State0\ at\ time\ indexi-1)}$+Euclidean
Distance$_{(State0 \rightarrow State1)}$−Prior State
Metric$_{(State1\ at\ time\ indexi-1)}$+Euclidean
Distance$_{(State1 \rightarrow State1)}$.

Based upon the aforementioned calculations, codeword detector circuit 588 provides a data output 586 in accordance with the following pseudo-code:

```
If ( [(OneStateMetric − ZeroStateMetric) > 0 & & First Delta < 0] OR
    [(OneStateMetric − ZeroStateMetric) < 0 & & Second Delta < 0] )
{
    Data Output 586 = '0' (corresponding to a wide bi-phase '0011')
}
Else
{
    Data Output 586 = '1' (corresponding to a wide bi-phase '1100')
}
```

Data output 586 is provided to a multiplexer circuit 550. In addition, the calculated Euclidean distance corresponding to the selected data output is provided as a distance output 584 to a distance comparison circuit 542.

Distance comparison circuit 542 is operable to determine the smallest of distance output 534, distance output 574 and a distance output 584; and to assert a selector value 544 based upon the identified smallest distance. Selector value 544 is provided to multiplexer circuit 550. Where distance output 534 is the smallest, distance comparison circuit 542 asserts selector value 544 such that multiplexer circuit 550 provides data output 536 as output 520. Alternatively, where distance output 574 is the smallest, distance comparison circuit 542 asserts selector value 544 such that multiplexer circuit 550 provides data output 576 as output 520; or where distance output 584 is the smallest, distance comparison circuit 542 asserts selector value 544 such that multiplexer circuit 550 provides data output 586 as output 520.

Output 520 is provided to a servo address mark detector circuit 522 and a Gray code processing circuit 526. Servo address mark detector circuit 522 may be any servo address mark detector circuit known in the art. In one particular embodiment of the present invention, servo address mark detector circuit 522 continually compares a series of the most recently received values of output 520 with a predefined or programmable servo address mark pattern to detect a match. When a match is detected, a SAM output 524 is asserted indicating a SAM found condition. Based upon the disclosure provided herein, one of ordinary skill in the art will recognize a variety of patterns that may be used as the servo address mark pattern. Gray code processing circuit 526 may be any Gray code processing circuit known in the art that is capable of performing Gray code processing on output 520 to yield a Gray code output 528 indicative of the status of the Gray code processing.

Figure 6:
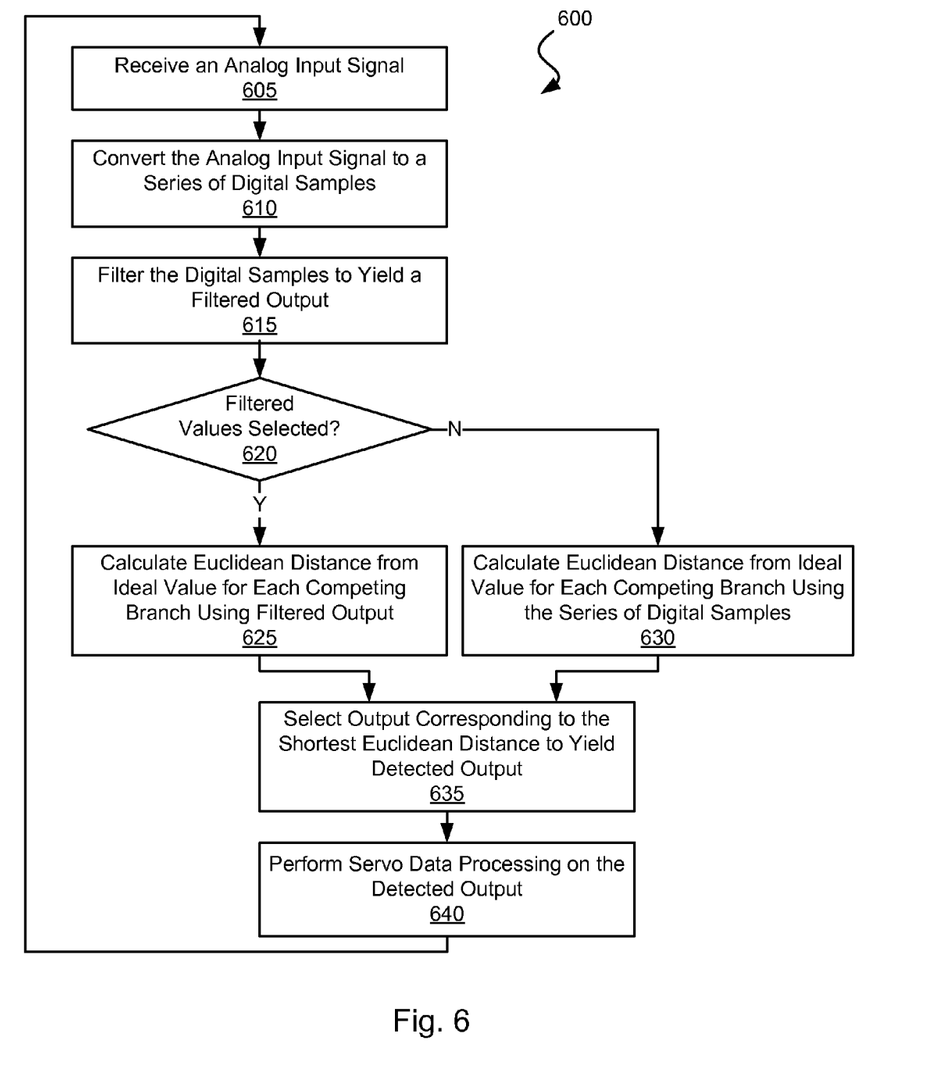
FIG. 6 shows a flow diagram of a method in accordance with some embodiments of the present invention for performing servo data processing.

Turning to FIG. 6, a flow diagram 600 shows a method in accordance with some embodiments of the present invention for performing servo data processing. Following flow diagram 600, an analog input signal is received (block 605). Analog input signal includes various information including, but not limited to, servo data to be processed. Such servo data may include, for example, a preamble pattern followed by a servo address mark and Gray code fields. The analog input signal may be received, for example, from a read/write head assembly that senses information from a storage medium or from a receiver that receives information from a transmission medium. Based upon the disclosure provided herein, one of ordinary skill in the art will recognize a variety of sources of the analog input signal, and a variety of information that may be received as part of a servo data field. The analog input signal is converted to a series of digital samples using an analog to digital converter circuit (block 610). The series of digital samples are synchronous to a sampling clock, and represent a value of the analog input signal at each particular sampling instant. Based upon the disclosure provided herein, one of ordinary skill in the art will recognize a variety of analog to digital conversion processes that may be applied in accordance with different embodiments of the present invention.

The series of digital samples are filtered using a digital finite impulse response filter to yield a filtered output (block 615). It is then determined whether the filtered output or the digital samples are to be used (block 620). Where the filtered output is to be used (block 620), a Euclidean distance is calculated from an ideal value to the filtered output in accordance with the following equations (block 625):

$$\text{Euclidean Distance}_{(State0 \rightarrow State0)} = \sum_{j=1}^{4} [\text{Filtered Output}(i, j) - \text{IdealPattern}_{(State0 \rightarrow State0)}(j)]^2,$$

$$\text{Euclidean Distance}_{(State1 \rightarrow State0)} = \sum_{j=1}^{4} [\text{Filtered Output}(i, j) - \text{IdealPattern}_{(State1 \rightarrow State0)}(j)]^2,$$

$$\text{Euclidean Distance}_{(State0 \rightarrow State1)} = \sum_{j=1}^{4} [\text{Filtered Output}(i, j) - \text{IdealPattern}_{(State0 \rightarrow State1)}(j)]^2,$$

and $$\text{Euclidean Distance}_{(State1 \rightarrow State1)} = \sum_{j=1}^{4} [\text{Filtered Output}(i, j) - \text{IdealPattern}_{(State1 \rightarrow State1)}(j)]^2.$$

In the preceding Euclidean distance equations the identifier (State 0→State 0) indicates a change from State 0 at a time index i−1 to State 0 at a time index i; the identifier (State 0→State 1) indicates a change from State 0 at a time index i−1 to State 1 at a time index i; the identifier (State 1→State 0) indicates a change from State 1 at a time index i−1 to State 0 at a time index i; and the identifier (State 1→State 1) indicates a change from State 1 at a time index i−1 to State 1 at a time index i.

Alternatively, where the digital samples are to be used (block 620), a Euclidean distance is calculated from the ideal value to the digital samples in accordance with the following equations (block 630):

$$\text{Euclidean Distance}_{(State0 \to State0)} = \sum_{j=1}^{4} [\text{Digital Samples}(i, j) - \text{IdealPattern}_{(State0 \to State0)}(j)]^2,$$

$$\text{Euclidean Distance}_{(State1 \to State0)} = \sum_{j=1}^{4} [\text{Digital Samples}(i, j) - \text{IdealPattern}_{(State1 \to State0)}(j)]^2,$$

$$\text{Euclidean Distance}_{(State0 \to State1)} = \sum_{j=1}^{4} [\text{Digital Samples}(i, j) - \text{IdealPattern}_{(State0 \to State1)}(j)]^2,$$

and $$\text{Euclidean Distance}_{(State1 \to State1)} = \sum_{j=1}^{4} [\text{Digital Samples}(i, j) - \text{IdealPattern}_{(State1 \to State1)}(j)]^2.$$

In the preceding Euclidean distance equations the identifier (State 0→State 0) indicates a change from State 0 at a time index i−1 to State 0 at a time index i; the identifier (State 0→State 1) indicates a change from State 0 at a time index i−1 to State 1 at a time index i; the identifier (State 1→State 0) indicates a change from State 1 at a time index i−1 to State 0 at a time index i; and the identifier (State 1→State 1) indicates a change from State 1 at a time index i−1 to State 1 at a time index i.

The aforementioned Euclidean distance values are used in an algorithm to select a data output that corresponds to the shortest Euclidean distance (block 635). The selected data output are provided as a detected output for use in downstream processing. As a particular example, data output selection algorithm includes determining a first and second state metrics corresponding to a transition from a prior zero state to a subsequent state (i.e., indicated by i−1) by adding a prior state metric corresponding to a transition from a zero state to the current state and corresponding to a transition from a prior one state to a subsequent state (i.e., indicated by i−1) by adding a prior state metric corresponding to a transition from a one state to the current state in accordance with the following equation:

First State Metric=Prior State Metric$_{(State0\ at\ time\ index i-1)}$+Euclidean Distance$_{(State0 \to State0)}$, and Second State Metric=Prior State Metric$_{(State1\ at\ time\ index i-1)}$+Euclidean Distance$_{(State1 \to State0)}$, and The minimum of the first state metric and the second state metric is selected as the state metric corresponding to a transition from a prior zero state to the current state (i.e., indicated by i). This state metric is referred to as the ZERO state metric. Similarly, the algorithm includes determining a third and fourth state metrics corresponding to a transition from a prior zero state to a subsequent state (i.e., indicated by i−1) by adding a prior state metric corresponding to a transition from a zero state to the current state and corresponding to a transition from a prior one state to a subsequent state (i.e., indicated by i−1) by adding a prior state metric corresponding to a transition from a one state to the current state in accordance with the following equation:

Third State Metric=Prior State Metric$_{(State0\ at\ time\ index i-1)}$+Euclidean Distance$_{(State0 \to State1)}$, and Fourth State Metric=Prior State Metric$_{(State1\ at\ time\ index i-1)}$+Euclidean Distance$_{(State1 \to State1)}$.

The minimum of the third state metric and the fourth state metric is selected as the state metric corresponding to a transition from a prior one state to the current state (i.e., indicated by i). This state metric is referred to as the ONE state metric.

The difference between the aforementioned state metrics is calculated and provided as a soft output (i.e., as an indicator of a likelihood that the appropriate next state was detected). The soft output where the selected next state is the zero state is calculated in accordance with the following equation:

First Delta=Prior State Metric$_{(State0\ at\ time\ index i-1)}$+Euclidean Distance$_{(State0 \to State0)}$−Prior State Metric$_{(State1\ at\ time\ index i-1)}$+Euclidean Distance$_{(State1 \to State0)}$.

Similarly, the soft output where the selected next state is the one state is calculated in accordance with the following equation:

Second Delta=Prior State Metric$_{(State0\ at\ time\ index i-1)}$+Euclidean Distance$_{(State0 \to State1)}$−Prior State Metric$_{(State1\ at\ time\ index i-1)}$+Euclidean Distance$_{(State1 \to State1)}$.

Based upon the aforementioned calculations, the algorithm provides the detected output in accordance with the following pseudo-code:

```
If ( [(OneStateMetric − ZeroStateMetric) > 0 & & First Delta < 0] OR
     [(OneStateMetric − ZeroStateMetric) < 0 & & Second Delta < 0] )
{
    Detected Output = '0' (corresponding to a wide bi-phase '0011')
}
Else
{
    Detected Output = '1' (corresponding to a wide bi-phase '1100')
}
```

The detected output is used to perform servo data processing (block 640). Such servo data processing includes, but is not limited to, servo address mark detection and Gray code processing as are known in the art.

Various of the aforementioned embodiments provide a variety of advantages that may include, but are not limited to: (1) Enhanced noise immunity due to use of a symbol-level Euclidean distance detector for servo sector address mark, wedge ID, track ID detection; (2) The detector may use equalized Y samples as input or analog-to-digital converter output as input; (3) A detector bank may be used in the presence of radial incoherence, imperfect of timing acquisition/tracking to further enhance performance; (4) The Y ideal values for detection may be programmable, and can be pre-computed in a look-up table; (5) The Y ideal values may be adapted on-the-fly using servo address mark pattern; (6) The detection algorithm may be Euclidean distance or its simplified version such as absolute value for complexity reduction; (7) The algorithm may be applied zoned servo data format; and (8) Soft information may be generated during detection to tell user how reliability the detected sequence is. Separate soft information can be generated for servo address mark part, and wedge ID, track ID part for reliability information for different portion of servo. Of note, some embodiments of the present invention may be modified to perform bit-level Euclidean distance detection instead of the codeword based detection.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for performing servo data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing circuit, the circuit comprising:
    a detector circuit operable to apply a data detection algorithm to a data input corresponding to an encoded servo data region to yield a detected output;
    a servo address mark processing circuit operable to identify a pre-defined pattern in the detected output; and
    wherein the data detection algorithm includes:
        calculating a first Euclidean distance between an ideal pattern and a codeword received as part of the data input for a first detector branch, and calculating a second Euclidean distance between the ideal pattern and a codeword received as part of the data input for a second detector branch; and
        selecting the detected output as the value represented by either the first detector branch or the second detector branch that corresponds to the smaller of the first Euclidean distance or the second Euclidean distance.

2. The data processing circuit of claim 1, wherein the circuit further comprises:
    an analog to digital converter circuit operable to provide a series of digital samples corresponding to an analog input signal; and
    wherein the series of digital samples is the data input.

3. The data processing circuit of claim 1, wherein the circuit further comprises:
    an analog to digital converter circuit operable to provide a series of digital samples corresponding to an analog input signal;
    a digital filter circuit operable to filter the series of digital samples to yield a filtered output; and
    wherein the filtered output is the data input.

4. The data processing circuit of claim 1, wherein the encoded servo data region includes a wide bi-phase servo address mark.

5. The data processing circuit of claim 1, wherein the data processing circuit is implemented as an integrated circuit.

6. The data processing circuit of claim 1, wherein the data processing circuit is implemented as part of a data storage device.

7. The data processing circuit of claim 6, wherein the storage device comprises:
    a storage medium maintaining information including servo data;
    a read/write head assembly operable to sense the information and to provide a corresponding continuous signal; and
    an analog to digital converter circuit operable to sample the continuous signal to yield a series of digital samples corresponding to the servo data.

8. The data processing circuit of claim 7, wherein the storage device further comprises:
    a digital filter circuit operable to filter the series of digital samples to yield a filtered output; and
    wherein the filtered output is the derivative of the digital samples.

9. The data processing circuit of claim 1, wherein the circuit further comprises:
    a storage device holding the ideal pattern, wherein the storage device is coupled to the detector circuit.

10. The data processing circuit of claim 9, wherein the ideal pattern is programmable.

11. The data processing circuit of claim 9, wherein the ideal pattern is adapted based upon servo address mark data.

12. The data processing circuit of claim 1, wherein the ideal pattern is a first ideal pattern corresponding to a first phase offset, and wherein the data detection algorithm further includes:
    calculating a third Euclidean distance between a second ideal pattern and a codeword received as part of the data input for the first detector branch, and calculating a fourth Euclidean distance between the second ideal pattern and a codeword received as part of the data input for the second detector branch, wherein the second ideal pattern corresponds to a second phase offset; and
    selecting a processing phase as either the first phase offset or the second phase offset that corresponds to the smaller of the first Euclidean distance, the second Euclidean distance, the third Euclidean distance, and the fourth Euclidean distance.

13. The data processing circuit of claim 12, wherein the data detection algorithm further includes:
    selecting the detected output as the value corresponding the processing phase and the smaller of the Euclidean distances related to the processing phase.

14. The data processing circuit of claim 1, wherein the codeword detector circuit is further operable to calculate a likelihood that the detected output is correct.

15. A method for processing servo data, the method comprising:
    receiving digital samples corresponding to servo data on a storage medium;
    calculating a first distance between a derivative of the digital samples and a first ideal pattern corresponding to a first phase offset, wherein the first distance corresponds to a first detector branch;
    calculating a second distance between the derivative of the digital samples and the ideal pattern, wherein the second distance corresponds to a second detector branch;
    calculating a third distance between the derivative of the digital samples and a second ideal pattern corresponding to a second phase offset, wherein the third distance corresponds to the first detector branch;
calculating a fourth distance between the derivative of the digital samples and the second ideal pattern, wherein the fourth distance corresponds to the second detector branch;
selecting either the first phase offset or the second phase offset that corresponds to the smaller of the first distance, the second distance, the third distance, or the fourth distance;
providing a detected output corresponding to the selected one of the first phase offset and the second phase offset.

16. The method of claim 15, wherein the distance is selected from a group consisting of: a Euclidean distance, and an absolute value based distance.

17. A data processing circuit, the circuit comprising:
a detector circuit operable to apply a data detection algorithm to a data input corresponding to an encoded servo data region to yield a detected output, wherein the data detection algorithm includes:
calculating a first absolute value based distance between an ideal pattern and a codeword received as part of the data input for a first detector branch, and calculating a second absolute value based distance between the ideal pattern and a codeword received as part of the data input for a second detector branch; and
selecting the detected output as the value represented by either the first detector branch or the second detector branch that corresponds to the smaller of the first absolute value based distance and the second absolute value based distance; and
a servo address mark processing circuit operable to identify a pre-defined pattern in the detected output.

18. The data processing circuit of claim 17, wherein the first ideal pattern corresponds to a first phase offset, and wherein the data detection algorithm further includes:
calculating a third absolute value based distance between a second ideal pattern and a codeword received as part of the data input for the first detector branch, and calculating a fourth absolute value based distance between the second ideal pattern and a codeword received as part of the data input for the second detector branch, wherein the second ideal pattern corresponds to a second phase offset; and
selecting a processing phase as either the first phase offset or the second phase offset that corresponds to the smaller of the first absolute value based distance, the second absolute value based distance, the third absolute value based distance, and the fourth absolute value based distance.

19. The data processing system of claim 17, wherein the data detection algorithm further includes:
selecting the detected output as the value corresponding the processing phase and the smaller of the absolute value based distances related to the processing phase.

20. The data processing circuit of claim 17, wherein the storage device comprises:
a storage medium maintaining information including servo data;
a read/write head assembly operable to sense the information and to provide a corresponding continuous signal; and
an analog to digital converter circuit operable to sample the continuous signal to yield a series of digital samples corresponding to the servo data.

21. The data processing circuit of claim 20, wherein the storage device further comprises:
a digital filter circuit operable to filter the series of digital samples to yield a filtered output; and
wherein the filtered output is the derivative of the digital samples.

22. The data processing circuit of claim 17, wherein the circuit further comprises:
an analog to digital converter circuit operable to provide a series of digital samples corresponding to an analog input signal; and
wherein the series of digital samples is the data input.

23. The data processing circuit of claim 17, wherein the circuit further comprises:
an analog to digital converter circuit operable to provide a series of digital samples corresponding to an analog input signal;
a digital filter circuit operable to filter the series of digital samples to yield a filtered output; and
wherein the filtered output is the data input.

24. The data processing circuit of claim 17, wherein the encoded servo data region includes a wide bi-phase servo address mark.

25. The data processing circuit of claim 17, wherein the data processing circuit is implemented as an integrated circuit.

* * * * *